(12) United States Patent
Amacker et al.

(10) Patent No.: US 7,849,964 B2
(45) Date of Patent: Dec. 14, 2010

(54) CLIMBING TREE STAND AND GAME CART

(76) Inventors: Joseph Amacker, 270 Adcox Rd., Rayville, LA (US) 71269; Thomas Lord, 419 Overland State Rd., Rayville, LA (US) 71269

( * ) Notice: Subject to any disclaimer, the term of this patent is extended or adjusted under 35 U.S.C. 154(b) by 0 days.

(21) Appl. No.: 12/372,247

(22) Filed: Feb. 17, 2009

(65) Prior Publication Data

US 2009/0205905 A1 Aug. 20, 2009

Related U.S. Application Data

(60) Provisional application No. 61/028,788, filed on Feb. 14, 2008.

(51) Int. Cl.
*A63B 27/00* (2006.01)
(52) U.S. Cl. .......................... 182/136; 182/187; 182/20
(58) Field of Classification Search .................. 182/20, 182/135, 136, 200
See application file for complete search history.

(56) References Cited

U.S. PATENT DOCUMENTS

| | | | |
|---|---|---|---|
| 3,336,999 A | | 8/1967 | McSwain |
| 4,045,040 A | | 8/1977 | Fails |
| 4,137,995 A | * | 2/1979 | Fonte ........................ 182/135 |
| 4,321,982 A | | 3/1982 | Strickland |
| 4,323,260 A | | 4/1982 | Suchy |
| 4,331,216 A | | 5/1982 | Amacker |
| 4,552,246 A | | 11/1985 | Thomas |
| 4,667,773 A | | 5/1987 | Davis |
| 4,708,221 A | | 11/1987 | Kubiak |
| 4,726,447 A | * | 2/1988 | Gibson et al. ............... 182/135 |
| 5,016,733 A | * | 5/1991 | Bradley ...................... 182/187 |
| 5,090,505 A | * | 2/1992 | Amacker .................... 182/187 |
| 5,253,732 A | | 10/1993 | Daniels |
| 5,265,780 A | * | 11/1993 | Matthews et al. ........... 224/155 |
| 5,282,520 A | | 2/1994 | Walker |
| 5,295,556 A | | 3/1994 | Mullin |
| 5,314,042 A | | 5/1994 | Adams |
| 5,316,104 A | * | 5/1994 | Amacker ..................... 182/187 |
| 5,339,922 A | | 8/1994 | Beechler |
| 5,379,861 A | * | 1/1995 | Amacker ..................... 182/187 |
| 5,433,291 A | * | 7/1995 | Shoestock, Sr. .............. 182/20 |
| 5,482,137 A | | 1/1996 | McNeill |
| 5,492,196 A | * | 2/1996 | Michno ....................... 182/20 |
| 5,624,008 A | | 4/1997 | Beardslee, Jr. |
| 5,673,928 A | | 10/1997 | Jury |
| 5,740,882 A | | 4/1998 | Griffith et al. |
| 5,887,676 A | | 3/1999 | Harbin |
| 6,308,800 B1 | * | 10/2001 | Graham, Jr. ................. 182/136 |
| 6,481,529 B1 | | 11/2002 | Voorhies |
| 6,516,919 B1 | | 2/2003 | Sempel |
| 6,523,643 B1 | | 2/2003 | Rizza |

(Continued)

*Primary Examiner*—Katherine W Mitchell
*Assistant Examiner*—Daniel Cahn

(57) ABSTRACT

The present disclosure relates to tree stands which grasp upright columnar members for example, trees, poles, which are arranged to facilitate climbing and adjusting the height of the tree stand to a desired level and angle. When assembled as a cart, the invention consists of an upper climbing member or frame, lower climbing member or frame, a mechanical-interlocking system, an axle, wheels and a wheel attachment device. The two-climbing-member tree stand may be of a manually adjusting type or of a self-adjusting type which permit adjustment of the spacing of the grasping members so as to effect adjustment of the angle of each tree climber relative to the upright columnar member.

9 Claims, 10 Drawing Sheets

U.S. PATENT DOCUMENTS

| | | |
|---|---|---|
| 6,571,916 B1 | 6/2003 | Swanson |
| 6,622,823 B2 | 9/2003 | Engstrom |
| 6,637,708 B1 | 10/2003 | Peterson |
| 6,722,472 B2 | 4/2004 | Berkbuegler |
| 6,725,972 B1 | 4/2004 | Krier et al. |
| 6,883,644 B1 | 4/2005 | Braun et al. |
| 6,918,465 B2 | 7/2005 | Eastman, II |
| 6,942,064 B2 * | 9/2005 | Wolford .................... 182/136 |
| 6,986,404 B1 * | 1/2006 | Laborde .................... 182/135 |
| 7,174,995 B1 | 2/2007 | Alexander |
| 7,246,683 B2 | 7/2007 | Pringnitz |
| 7,306,074 B2 * | 12/2007 | Voorhies .................... 182/136 |
| 2003/0029675 A1 | 2/2003 | Prejean |
| 2004/0108165 A1 * | 6/2004 | Poole et al. .................. 182/136 |
| 2004/0222040 A1 | 11/2004 | Zirk |
| 2005/0039985 A1 | 2/2005 | Butterworth |
| 2005/0072632 A1 | 4/2005 | Muhich |
| 2005/0167200 A1 | 8/2005 | McFall et al. |
| 2006/0090962 A1 | 5/2006 | McGehee |
| 2006/0207831 A1 | 9/2006 | Moore et al. |
| 2007/0095614 A1 | 5/2007 | Mannor |
| 2007/0175702 A1 | 8/2007 | Simone |
| 2007/0209410 A1 | 9/2007 | Clum |

* cited by examiner

CLIMBING TREE STAND AND GAME CART

CROSS-REFERENCE TO RELATED APPLICATIONS

This patent application claims the benefit of U.S. Provisional Patent Application Ser. No. 61/028,788, entitled Climb and Carry Treestand, filed Feb. 14, 2008.

FIELD

The present disclosure is directed to tree stands for hunting, and more particularly to stands formed of two climbing members or frames which are alternately raised by the user to attain a desired elevation on the upright columnar member and which are convertible to a cart for carrying game or other materials by joining the two climbing members by mechanical interlocking means.

BACKGROUND

Tree stands, or tree climbers, may be configured to grasp upright columnar members for example, trees, poles or the like, and more particularly, to stands formed of two climbing members or frames which are alternately raised by the user to attain a desired elevation on the upright columnar member. A two climbing member tree stand may be of a manually adjusting type or of a self-adjusting type which permit adjustment of the spacing of the grasping members so as to effect adjustment of the angle of each tree climber relative to the upright columnar member.

Tree stands may be convertible to a cart for carrying game or other materials. The use of various types of tree stands convertible to carts is known in the prior art, however many of these prior art inventions relate to tree stands not comprised of the two-part grasping-type tree climbers which provide a number of advantages over other types of stands. Two-part grasping-type tree climbing stands allow the user to place his or her weight on the top section so that the bottom section may be raised and repositioned on the tree, pole or the like. Once the bottom section has been repositioned, the user places his or her weight on the bottom section so that the top section may be raised and repositioned on the tree, pole or the like. When the top section is repositioned, the user then transfers his or her weight to the top section again and repeats the climbing cycle. Advantages of a two-part climbing tree stand include portability, ease and speed of setup, and flexibility of seating position. Additionally, when both the user and the entire tree stand are in an elevated position above a deer's head, the deer is less likely to see or smell the user.

Various arrangements of climbing tree stands exist which have upper and lower climbing members that can be connected by the use of quick-clip pins or other types of fasteners or pins, for example, ball lock pins, detent pins or expanding pins, to change from a tree stand to a two-wheeled cart. The fasteners that are needed to connect the upper and lower climbing members together to form a cart are loose pieces that may be lost or misplaced in the field, rendering the cart feature inoperable. Additionally, to connect the upper and lower climbing members together and apply the fasteners takes time, which may prove to be difficult depending upon the amount of daylight available and the ambient temperature.

What is needed is a climbing tree stand that can be easily and efficiently converted into a cart in a rapid manner without the use of connecting fasteners for the upper and lower climbing members.

SUMMARY OF THE INVENTION

In view of the foregoing limitations and shortcomings of the prior art devices, as well as other disadvantages not specifically mentioned above, it should be apparent that there still exists a need in the art for a climbing stand which is safe and simple to use, both during and after placement on an upright columnar member for example, a tree, pole or the like, and during the removal therefrom and which can easily and efficiently be converted into a cart in a rapid manner without the use of fasteners for connecting the upper and lower climbing members. The present disclosure provides a simple, reliable climbing stand comprised of two frame members which surround the tree, pole, etc., in which the spacing of the grasping or gripping members of each of the two frame members is manually adjustable or self-adjustable.

One embodiment discloses an apparatus for climbing an upright columnar member. The apparatus includes a first climbing member including an inner frame having a first jaw to grip the columnar member and a pair of inner arms connected to the first jaw and adapted to extend outwardly from the columnar member; an outer frame having a second jaw to grip the columnar member the second jaw lying in a separate plane from the first jaw and disposed on the side of the columnar member opposite the side gripped by the first jaw, and a pair of outer arms connected to the second jaw and adapted to extend outwardly from the columnar member. The inner and outer frames are pivotally connected adjacent one end of the pair of outer arms. A pair of connectors is attached to the inner and outer frames to maintain a relationship between the inner frame and the outer frame. An adjustment arrangement is configured to engage or disengage the second jaw from the outer arms to permit extension and retraction of the distance between the first jaw and the second jaw to accommodate a circumference of the columnar member. A second climbing member includes an inner frame having a third jaw to grip the columnar member and a pair of inner arms connected to the third jaw and adapted to extend outwardly from the columnar member. An outer frame includes a fourth jaw to grip the columnar member, the fourth jaw lying in a separate plane from the third jaw and disposed on the columnar member opposite the third jaw. A pair of outer arms is connected to the fourth jaw and adapted to extend outwardly from the columnar member. Inner and outer frames are pivotally connected adjacent one end of the pair of arms. A pair of connectors is attached to the inner and outer frames to maintain a relationship between the inner frame and the outer frame. An adjustment arrangement is provided for engaging and disengaging the fourth jaw from the outer arms to permit extension and retraction of the distance between the first jaw and the second jaw to accommodate the upright columnar member. A surface is mounted on the inner frame and a strap is attached to the inner frame and extending across the surface. The first and second climbing members are adapted to be used stepwise in tandem fashion to ascend or descend the upright columnar member. A wheel assembly is removably attachable to the inner frame of the first climbing member or the second climbing member. The first climbing member includes an interlock member to engage the second climbing member to form a cart.

Another embodiment discloses an apparatus for climbing an upright columnar member. A first climbing member includes an inner frame having a first jaw to grip the columnar member and a pair of inner arms connected to the first jaw and adapted to extend outwardly from the columnar member. An outer frame includes a second jaw to grip the columnar member. The second jaw lies in a separate plane from the first jaw and is disposed on the columnar member opposite the first jaw, and a pair of outer arms connected to the second jaw and adapted to extend outwardly from the columnar member. Inner and outer frames are pivotally connected adjacent one end of the pair of outer arms. A pair of connectors is attached to the inner and outer frames to maintain a relationship between the inner frame and the outer frame. An adjustment arrangement engages or disengages the second jaw from the outer arms to permit extension and retraction of the distance between the first jaw and the second jaw to accommodate a circumference of the columnar member. The adjustment arrangement has an adjustment assembly removably attached to the second jaw and slidably mounted on each outer arm; the adjustment arrangement comprising a locking pin engageable with the outer arm for retaining the adjustment arrangement in a selected position along the length of the outer arm. A resilient biasing member is releasably attached to the adjustment arrangement and independent of the first jaw, for biasing the second jaw against the columnar member. An attachment device is connected to the resilient biasing member for externally securing the resilient biasing member to the outer arms, The attachment device is attachable and detachable from the outer arms while the climbing apparatus is in use. A second climbing member includes an inner frame having a third jaw configured to grip the columnar member and a pair of inner arms connected to the third jaw and adapted to extend outwardly from the columnar member. An outer frame includes a fourth jaw to grip the columnar member. The fourth jaw lies in a separate plane from the third jaw and is disposed on the side of the columnar member opposite the side gripped by the third jaw. A pair of extendable outer arms is connected to the fourth jaw and adapted to extend outwardly from the columnar member. Inner and outer frames are pivotally connected adjacent one end of the pair of outer arms. A pair of connectors is attached to the inner and outer frames to maintain a relationship between the inner frame and the outer frame. A surface is mounted on the inner frame, and a strap is attached to the inner frame and extending across the surface. An adjustment arrangement engages and disengages the fourth jaw from the outer arms to permit extension and retraction of the distance between the third jaw and the fourth jaw to accommodate the columnar member. The adjustment arrangement is comprised of an assembly removably attached to the fourth jaw and slidably mounted on the outer arms. The adjustment arrangement comprising a locking member configured to maintain the adjustment arrangement in a selected position along the length of the outer arms. A resilient biasing member is releasably attached to the adjustment arrangement and independent of the third jaw, for biasing the fourth jaw against the columnar member. An attachment device is connected to the resilient biasing member for externally securing the resilient biasing member to the outer arms. The attachment device is attachable and detachable from the outer arms while the climbing apparatus is in use. The first and second climbing members are adapted to be used stepwise in tandem fashion to ascend or descend the columnar member. Another advantage is a means to enable the user to safely and securely hold the upper frame member to the lower frame member.

A further embodiment discloses an apparatus for climbing an upright columnar member. The apparatus includes an inner frame having a first jaw to grip the columnar member and a pair of inner arms connected to the first jaw and adapted to extend outwardly from the columnar member. An outer frame includes a second jaw to grip the columnar member. The second jaw lies in a separate plane from the first jaw and is disposed on the columnar member opposite the side gripped by the first jaw, and a pair of outer arms connected to the second jaw and adapted to extend outwardly from the columnar member. The inner and outer frames are pivotally connected adjacent one end of the pair of outer arms. A pair of connectors is attached to the inner and outer frames to maintain a relationship between the inner frame and the outer frame. An adjustment arrangement engages or disengages the second jaw from the outer arms to permit extension and retraction between the first jaw and the second jaw to accommodate the columnar member. The adjustment arrangement includes an adjustment assembly removably attached to the second jaw and slidably mounted on the outer arms. The adjustment arrangement includes a locking member configured to maintain the adjustment arrangement in a selected position along the length of the outer arms. A resilient biasing member is releasably attached to the adjustment arrangement and independent of the first jaw, for biasing the second jaw against the columnar member. And an attachment device is connected to the resilient biasing member for securing the resilient biasing member to the outer arms. The attachment device attachable and detachable from the outer arms while the climbing apparatus is in use.

One advantage is a climbing stand which, when in place, offers the user side support in any direction, thus eliminating the danger of falling when the hunter is shooting from awkward positions.

A further advantage is an improved means for adjusting the angles formed by the upper frame member and lower frame member relative to the upright columnar member so that the user may be maintained in a level position or in a position slightly inclined, or cocked, toward the tree to tend to force the user toward the tree rather than away from the tree. These objects are achieved by a two-part climbing stand with an upper climbing member and a lower climbing member in which each climbing member has opposing gripping members which encircle and engage the upright columnar member, at least one of which is attached to adjusting assemblies slidable upwardly and downwardly along parallel arms of the climbing member frame. A spring-biased pin maintains the position of the adjusting assembly along the length of the climbing member frame and releases the adjusting assembly from the parallel arms of the climbing member frame. A resilient biasing member, for example, an elastic cord or spring, maintains the gripping members attached to the adjusting assembly in contact with the upright columnar member. Thus, when each climbing member is raised in alternating fashion, by adjusting the position of the adjusting assembly along the length of parallel arms of the climbing member frame, the spacing between the gripping member attached to the adjusting assembly and the other gripping member can be changed automatically, or be rendered self-adjusting, and thereby the angle can be adjusted such that each member is substantially level and parallel to the ground or maintained at some other preferred orientation at each elevation.

Still another advantage is a substantially level platform for standing and sitting at lower elevations while achieving the desired angle at the ultimate elevation.

Other objects and advantages of the present disclosure will become apparent and obvious from a study of the following description and accompanying drawings which are merely illustrative of the invention. Other features and advantages of the present disclosure will be apparent from the following more detailed description of the preferred embodiment, taken in conjunction with the accompanying drawings which illustrate, by way of example, the principles of the invention.

BRIEF DESCRIPTION OF THE DRAWINGS

FIG. 6A illustrates a cross-sectional detail of an adjusting assembly.

DETAILED DESCRIPTION OF THE INVENTION

Figure 1:
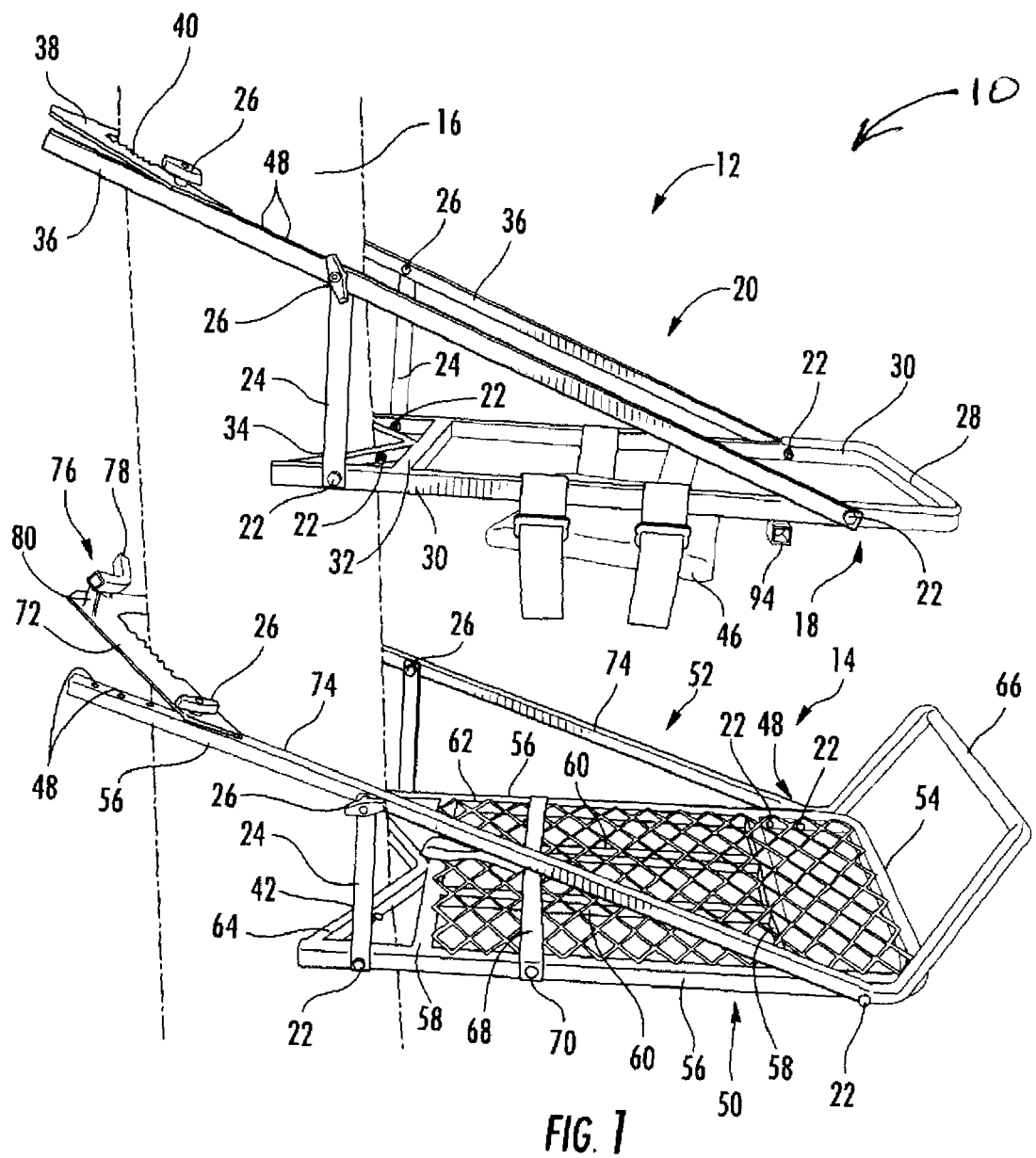
FIG. 1 illustrates a perspective view of a first embodiment of the invention which is a manually adjusting tree climber stand mounted on the trunk of a tree.
Figure 1A:
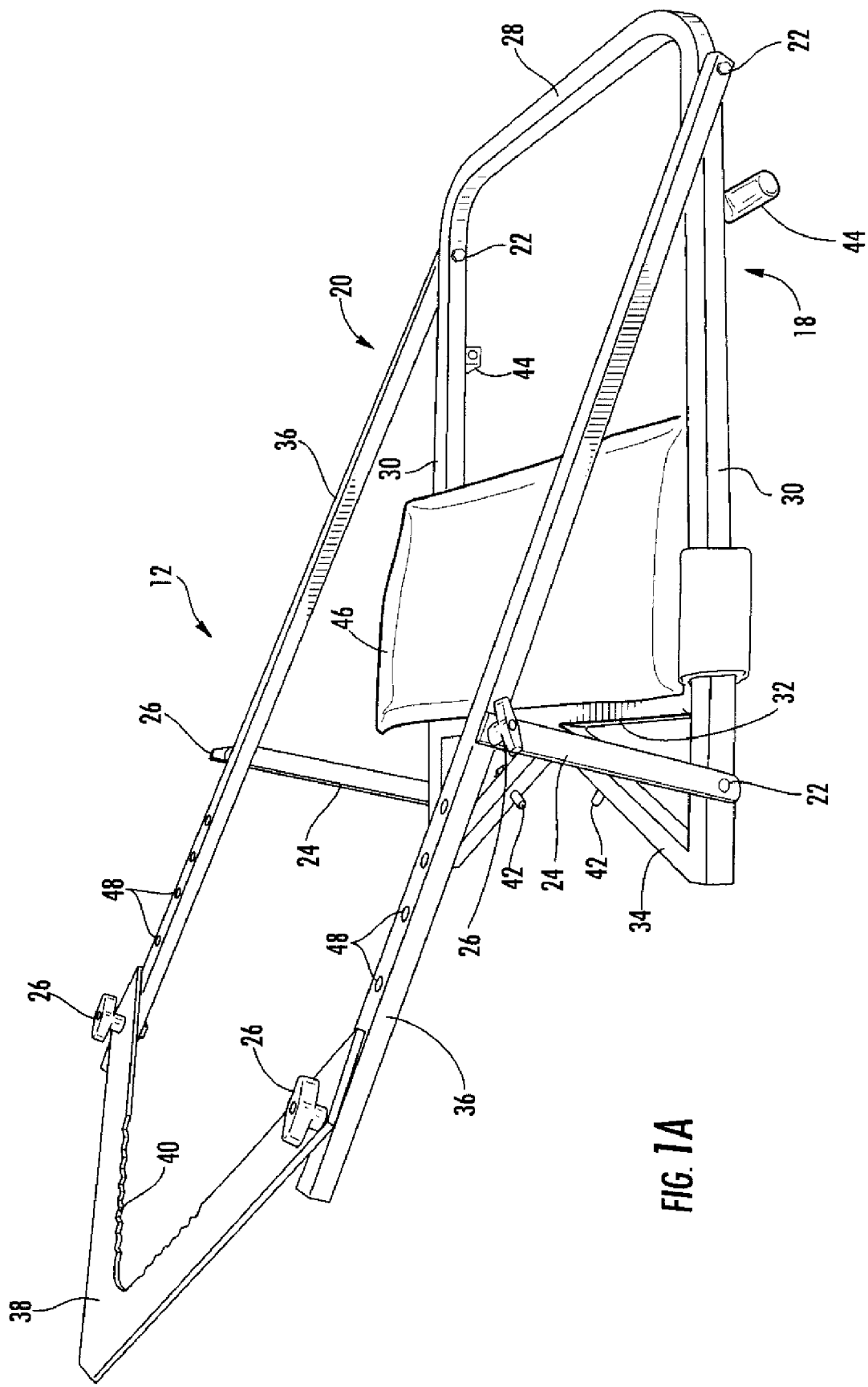
FIG. 1A illustrates a perspective view of an upper climbing member of the tree climber stand of FIG. 1.
Figure 1B:
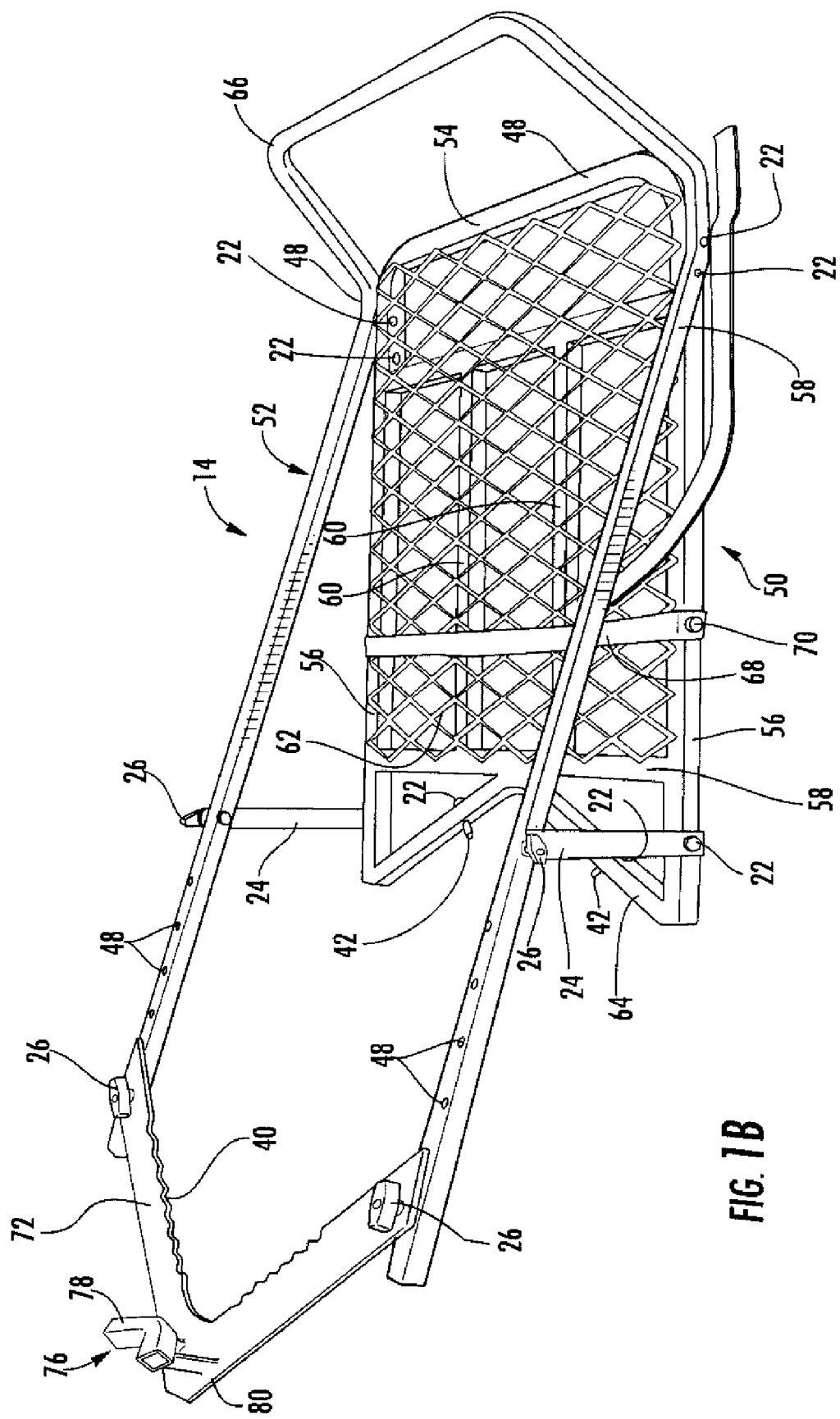
FIG. 1B illustrates a perspective view of a lower climbing member of the tree climber stand of FIG. 1.

Referring now in detail to the drawings, wherein like parts are designated by like numerals, there is illustrated in FIGS. 1, 1A and 1B a first embodiment includes a manually adjusting tree climber stand convertible to a cart by interlocking means. As shown in FIGS. 1, 1A and 1B, an apparatus is disclosed, designated generally as climbing apparatus 10, includes a first, or upper, climbing member 12 and a second, or lower, climbing member 14. The upper climbing member 12 and the lower climbing member 14 are disposed around the circumference of an upright columnar member 16, for example, a tapered tree trunk. Upper climbing member 12 and lower climbing member 14 each include a number of substantially identical components, which are designated by the same numerals.

Figure 5:
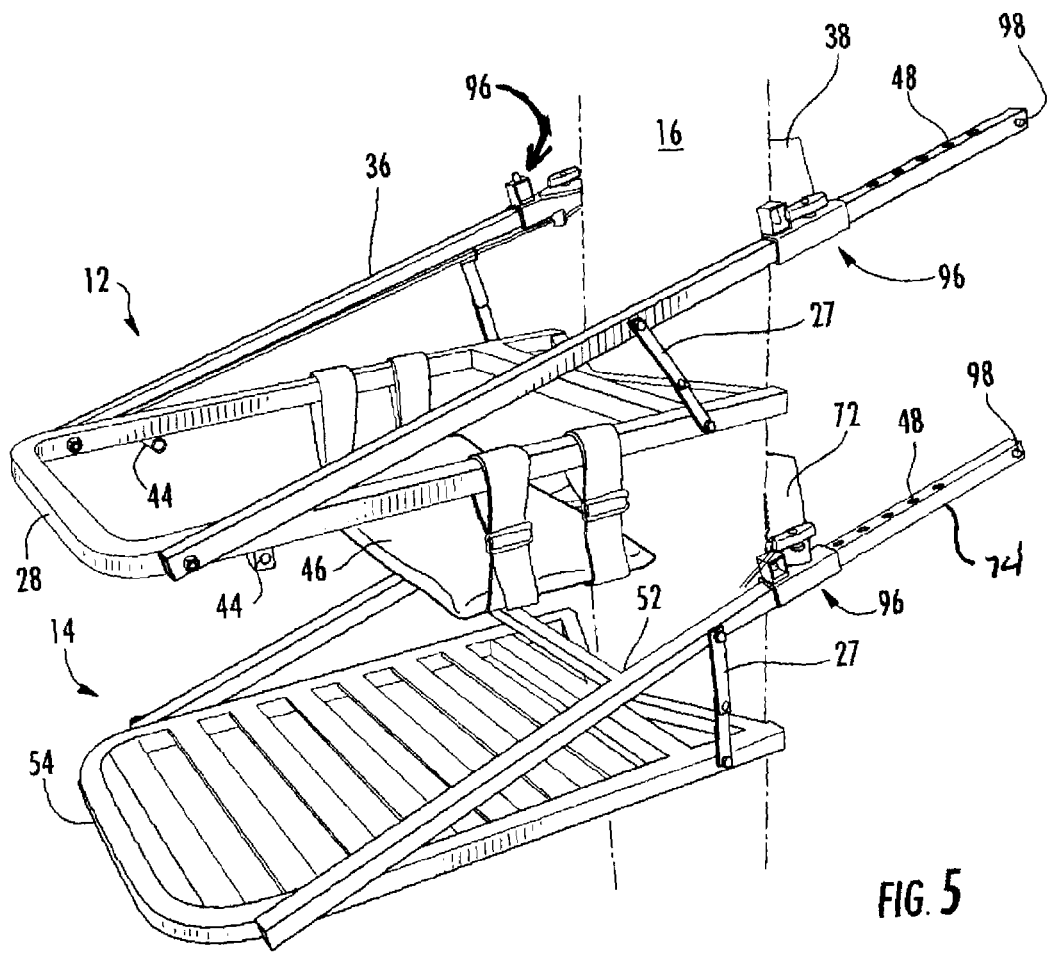
FIG. 5 illustrates a perspective view of an alternate embodiment, of a self-adjusting tree climber stand mounted on the trunk of a tree.

Upper climbing member 12 is comprised of a tubular inner frame 18 and a tubular outer frame 20, which are pivotally attached by fasteners 22, for example, a nut and bolt arrangement, with the nut affixed to the exterior side surface of outer frame 20. A first and second connecting member 24 are disposed between inner frame 18 and outer frame 20. Each connecting member 24 is attached to inner frame 18 by fasteners 22, in this case with the nut affixed to the inner side surface of inner frame 18, and to outer frame 20 by a fastener 26, which in the exemplary embodiment is shown as a wing nut and bolt arrangement, but may be any suitable fastener such as a nut and bolt, lever clamp, etc. The fastener 26 allows for connecting member 24 to be detached from outer frame 20 so that the upper climbing member 12 may be collapsed to a flat position for easy handling and storage. Alternatively, connecting member 24 may be comprised of a locking hinged connecting member 27 as depicted in FIG. 5 which would allow upper climbing member 12 to be collapsed to a flat position without the removal of a fastening device. Inner frame 18 is comprised of a base end 28, a first and second inner parallel arm 30 projecting outward from base end 28, a first cross member 32 connecting and bracing the inner parallel arms 30, and an inner jaw 34 at the distal ends of inner parallel arms 30, said inner jaw 34 having a concave shape for engaging one side of the upright columnar member 16. Outer frame 20 has an outer jaw 38 attached by suitable means, such as fastener 26 to the projecting ends of the first and second outer parallel arms 36. Outer jaw 38 can be provided with serrations or teeth 40 or alternatively can be provided with other gripping means such as replaceable spikes 42 attached to inner jaw 34 by fasteners 22. A seat 46 is slidably mounted on inner frame 18. The seat 46 position may be adjusted between cross member 32 and axle sleeve 44. In the embodiment shown in FIGS. 1, 1A and 1B, the length of the first and second inner parallel arms 30 permit seat 46 to be positioned toward the pivotal connection of inner frame 18 and outer frame 20 to permit the user to sit inside the inner frame 18 and outer frame 20, facing the columnar member 16. The seat 46 can also be moved along inner frame 18 toward cross member 32 to permit the user to sit facing away from the columnar member 16. The upper climbing member 12 is attached or removed from the upright columnar member 16 by removing a fastener 26 from outer jaw 38. When attaching the upper climbing member 12 to columnar member 16, the distance between inner jaw 34 and outer jaw 38 is set by inserting the fastener 26 through the appropriate hole 48 of a plurality of holes spaced along a part of the length of the first and second outer parallel arms of outer frame 20.

Lower climbing member 14 is substantially the same as upper climbing member 12 except that lower climbing member 14 is adapted to serve as standing platform and a footrest. Hence, no seat is provided on lower climbing member 14. Lower climbing member 14 includes a tubular inner frame 50 and a tubular outer frame 52, which are pivotally attached by fasteners 22. First and second connecting members 24 are disposed between inner frame 50 and outer frame 52. Each connecting member 24 is attached to inner frame 50 by fasteners 22, and to outer frame 52 by fastener 26. Inner frame 50 includes a base end 54, a first and second inner parallel arm 56 projecting outward from base end 54, a first and second cross member 58 connecting and bracing the inner parallel arms 56, a first and second cross brace 60 connecting the first and second cross member 58 to provide strength to the inner frame 50 and act as a base for a mesh screen floor 62 and an inner jaw 64 at the distal ends of inner parallel arms 56. Outer frame 52 includes an outer jaw 72 attached by suitable means, such as fastener 26 to the projecting ends of the first and second outer parallel arms 74. Foot rest bar 66 attached to the first and second outer parallel arms 74 by fasteners 22. The foot rest bar 66 may be adjusted by inserting the fasteners 22 into the appropriate hole 48 of a plurality of holes spaced along the distal ends of the foot rest bar 66. An adjustable foot strap 68 is affixed by a permanent fastener 70 to the first and second inner parallel arms 56. Adjustable foot strap 68 is used by the user to lift the lower climbing member 14 up with the foot of the user while seated in seat 46 so that the lower climbing member 14 may be repositioned at a greater height on upright columnar member 16. An interlocking member 76 is affixed to the top surface of outer jaw 72, in this case by welding. The interlocking member 76 includes a tubular catch 78 mounted on a first and second catch leg 80.

Lower climbing member 14 may be tethered to upper climbing member 12 by removable lines 82 which are shown attached to upper climbing member 12 on inner frame 18 and to the lower climbing member 14 on outer frame 52.

The opening 39 defined between inner jaw 34 and outer jaw 38 and inner jaw 64 and outer jaw 72 is occupied by the upright columnar member 16 engaged by upper climbing member 12 and lower climbing member 14. Because inner jaw 34/outer jaw 38 and inner jaw 64/outer jaw 72 are oriented offset or displaced vertically according to the spacing between upper climbing member 12 and lower climbing member 14, respectively, the horizontal distance relative to the upright columnar member 16 may be adjusted by changing the angle of the climbing member 12, 14 relative to the upright columnar member 16. In this case, the angle of the climbing member relative to the upright columnar member may be set when the upper climbing member 12 and lower climbing member 14 are attached to the tree, so that the tubular inner frame 50 and mesh screen floor 62 are generally level for the user to sit or stand. The angular adjustment may be made by removing a fastener 26 from outer jaw 38 and outer jaw 72 and setting the distance between the corresponding inner jaw and outer jaw by inserting the fastener 26 through the appropriate hole 48 of a plurality of holes 48 spaced along the first and second outer parallel arms of outer frame 20 and outer frame 52. The user preferably may set the angle based on the extent of tapering of the upright columnar member 16 at a predetermined climbing level or destination height of the upright columnar member 16, and by attaching upper climbing member 12 and lower climbing member 14 with base end 28 and base end 54 at an upward angle sufficient to bring the upper climbing member 12 and lower climbing member 14 approximately level with the ground at the destination height.

The tubular catch 78 of lower frame member 14 substantially conforms to the contour of inner jaw 34 of upper frame member 12 along its most concave point. In the exemplary embodiment, a piece of metal tubing similar to that used to manufacture inner jaw 34 is bent to the desired shape. Catch legs 80 provide sufficient offset height to align tubular catch 78 with the most concave portion of inner jaw 34 so that the two pieces lay along side each other with the side surface of inner jaw 34 which faces away from base end 28 laying against the side surface of tubular catch 78 which faces towards base end 54. When detached from upright columnar member 16, the cart is formed by affixing outer jaw 38 and outer jaw 72 to the hole 48 closest to the distal ends of the outer parallel arms 36 and outer parallel arms 74 respectively and securing the fastener 26.

Figure 2:
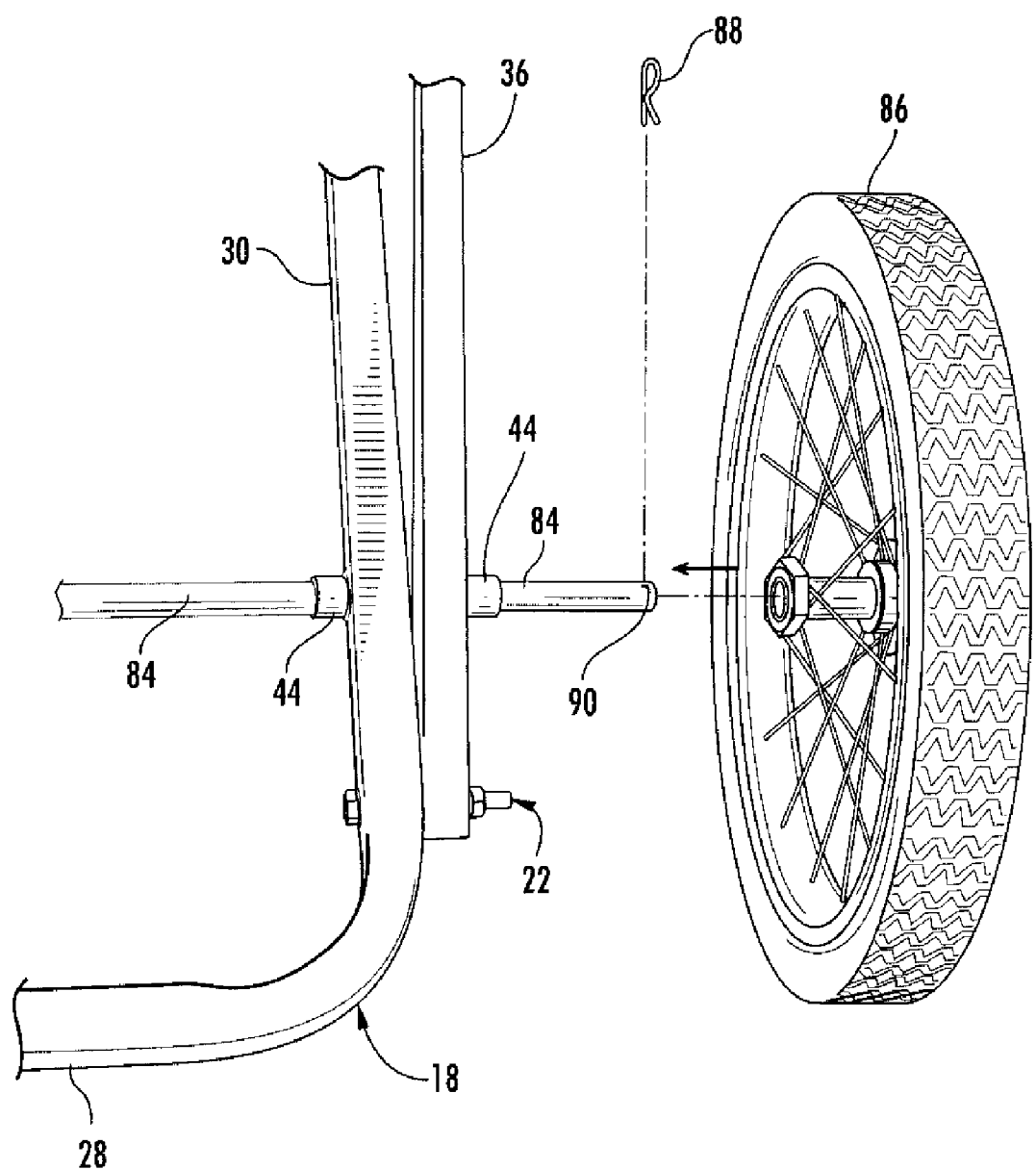
FIG. 2 illustrates a perspective exploded view of the wheel assembly.

Referring next to FIG. 2, a tubular axle sleeve 44 may be affixed, for example, by welding the tubular axle sleeve 44 to the bottom surface of the inner parallel arms 30 proximal to the pivotal connection of inner frame 18 and outer frame 20. Axle 84 is inserted through axle sleeves 44 and first and second wheels 86 are secured to axle 84 by suitable wheel fasteners known in the art. In one embodiment, the wheel 86 may be fastened to the axle 84 by a cotter pin 88 inserted through axle hole 90. The user may optionally use the tree stand while the axle 84 and wheel 86 mounted to the upper frame member 12 while it is being used as a tree stand.

Figure 3:
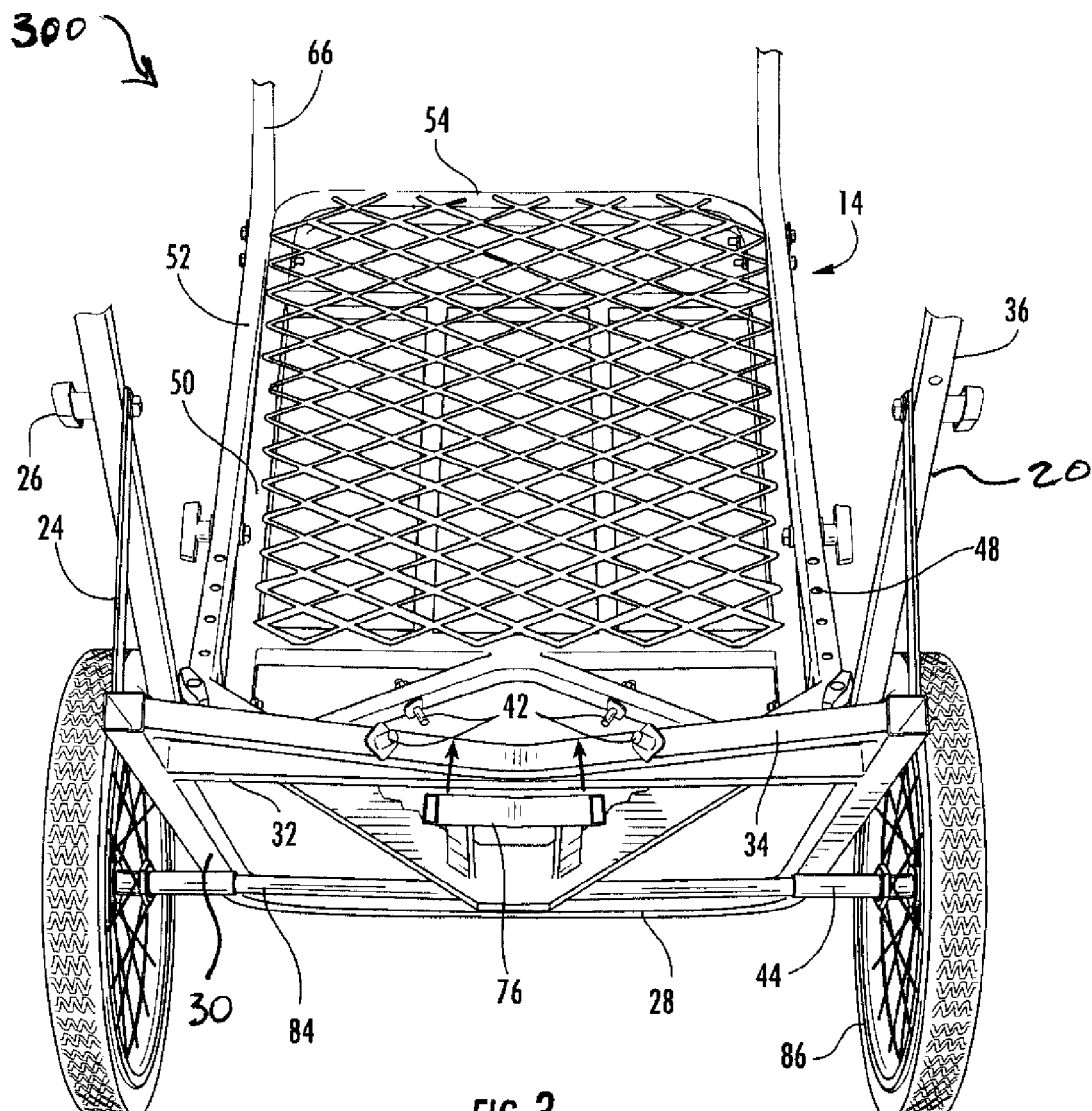
FIG. 3 illustrates a perspective view of the orientation of the interlocking means.

As shown in FIG. 3, a cart 300 is formed by drawing the outer jaw 72 of lower frame member 14 through the inner sides of the first and second inner parallel arms 30 of upper frame member 12 so the tubular catch 78 rests on the side of inner jaw 34 of upper frame member 12. Inner jaw 34 opens in the direction opposite from base end 28.

Figure 4:
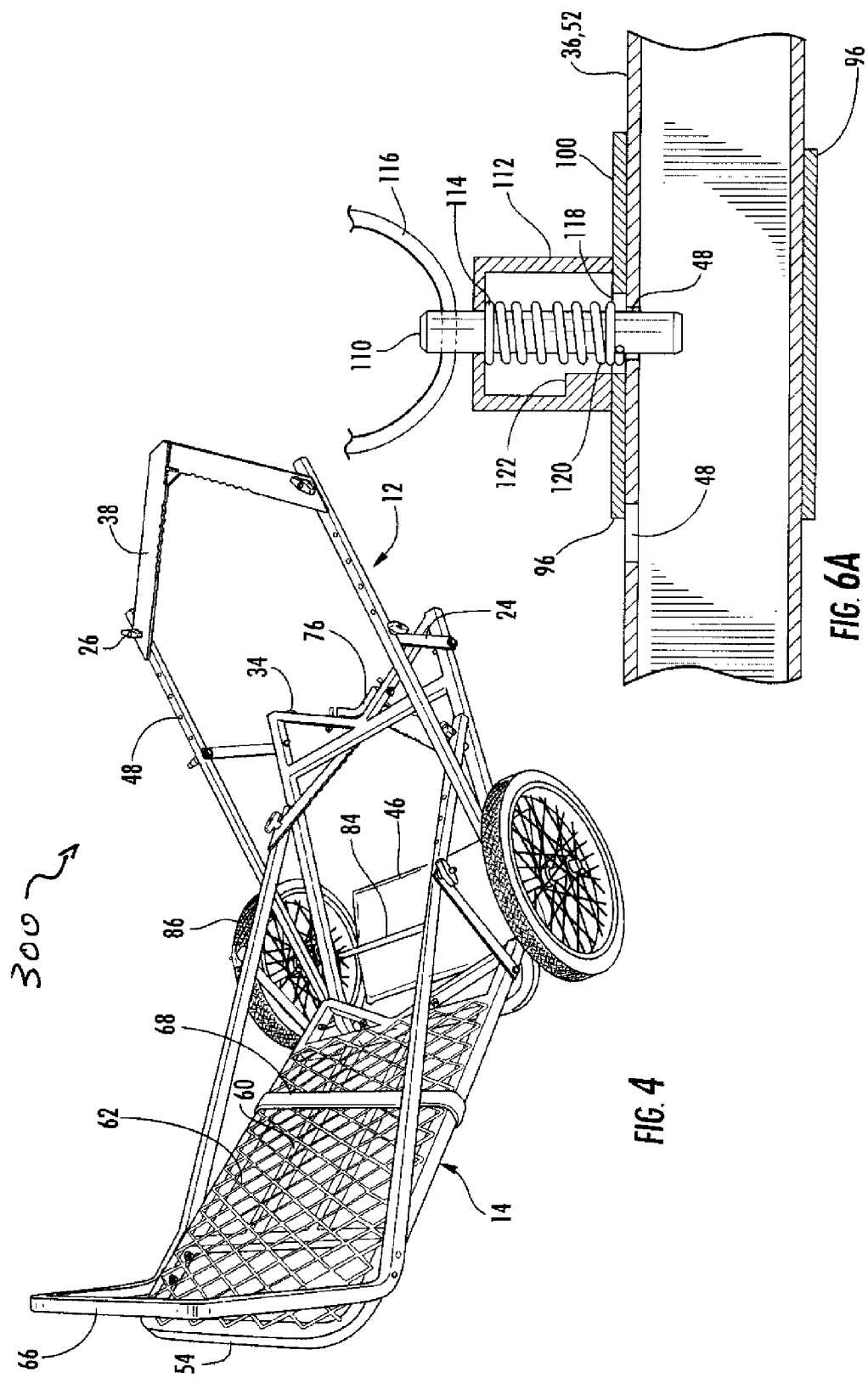
FIG. 4 illustrates a perspective view of the cart formed by interlocking the upper and lower climbing members.

Referring next to FIG. 4, when upper frame member 12 and lower frame member 14 are interlocked in the cart configuration, the projecting ends 56 of outer parallel arms 74 are resting on inner parallel arms 30 at a first pressure point 92 and the projecting ends of inner parallel arms 56 are resting on inner parallel arms 30 at a second pressure point 94. Thus, upper frame member 12 and lower frame member 14 are mechanically interlocked by operation of interlocking member 76 and the weight of lower frame member 14 resting on upper frame member 12.

FIG. 5 illustrates an alternate embodiment of a self-adjusting tree climber stand convertible to a cart by interlocking means. As shown in FIG. 5, a climbing apparatus 10 includes a first, or upper climbing member 12 and a second, or lower climbing member 14. Upper climbing member 12 and lower climbing member 14 are disposed around the circumference of an upright columnar member 16, such as a tapered tree trunk. Upper climbing member 12 and lower climbing member 14 each include a number of substantially identical components, which are designated by the same numerals.

Upper climbing member 12 includes a tubular inner frame 18 and a tubular outer frame 20, which are pivotally attached by fasteners 22, in this case, with the nut affixed to the exterior side surface of outer frame 20. First and second locking hinged connecting members 27 are disposed between inner frame 18 and outer frame 20. Each connecting member 27 is attached to inner frame 18 and to outer frame 20 by fasteners 22. The locking hinge arrangement of connecting member 27 allows upper climbing member 12 to be collapsed to a flat position without the removal of a fastening device. Alternatively, the connecting member may be comprised of a non-hinged connecting member 24 as depicted in FIG. 1. Inner frame 18 includes a base end 28, a first and second inner parallel arm 30 projecting outward from base end 28, a first cross member 32 connecting and bracing the inner parallel arms 30, and an inner jaw 34 at the distal ends of inner parallel arms 30, said inner jaw 34 having a concave shape for engaging one side of the upright columnar member 16. Outer frame 20 includes a first and second projecting outer parallel arm 36. A first and second adjusting assembly 96 is slidably attached around the first and second parallel arm 36, which are slidable upwardly and downwardly along the first and second outer parallel arm 36. A mechanical stop, for example, a detent button 98, is situated on the distal end of each outer parallel arm 36 to prevent adjusting assembly 96 from sliding off outer parallel arm 36 at the distal end.

Figure 6:
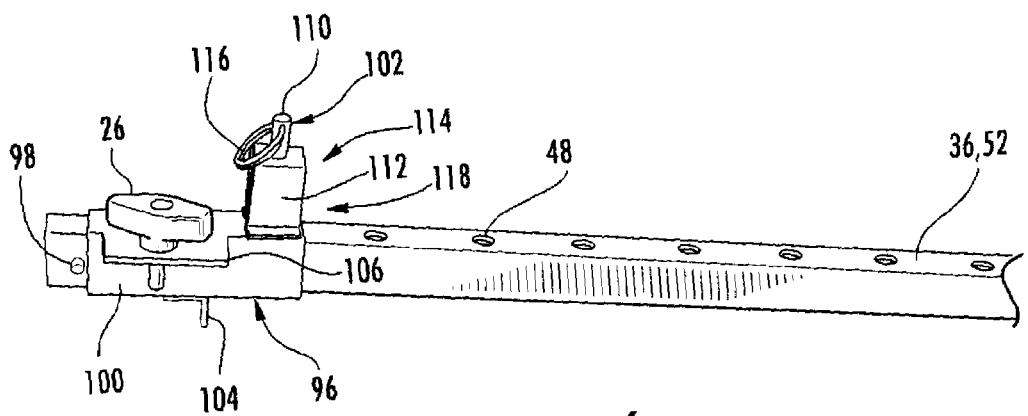
FIG. 6 illustrates a sectional view of adjusting assembly.

As shown in FIGS. 6 and 6A, each adjusting assembly 96 includes a tubular carriage 100 situated around outer parallel arm 36, a pin assembly 102 mounted on the top surface of the tubular carriage 100, a first retaining member 104 on the bottom surface of the tubular carriage 100 and a flange 106 on the interior side of the tubular carriage 100 facing the opposing outer parallel arm 36. Outer jaw 38 is attached at each end to flange 98 by fastener 26 through hole 48 in flange 106. Outer jaw 38 can be provided with serrations or teeth 40 or alternatively can be provided with other gripping means such as replaceable spikes 42 attached to inner jaw 64 by fasteners 22. Each adjusting assembly 96 is locked in place relative to each outer parallel arm 36 by pin assembly 102. Pin assembly 102 includes pin 110 biased within pin housing 112 by spring 114 and ring 116 is attached to pin 110. Pin 110 extends through hole 118 in adjusting assembly 96 into one of a plurality of holes 48 in outer parallel arm 36. Pin keeper 120 extends from a lower portion of pin 110 and is designed to engage housing shoulder or block 122 when pin 110 is lifted and turned approximately 90 degrees so as to lock pin 110 in a position out of holes 118, 48.

Figure 7:
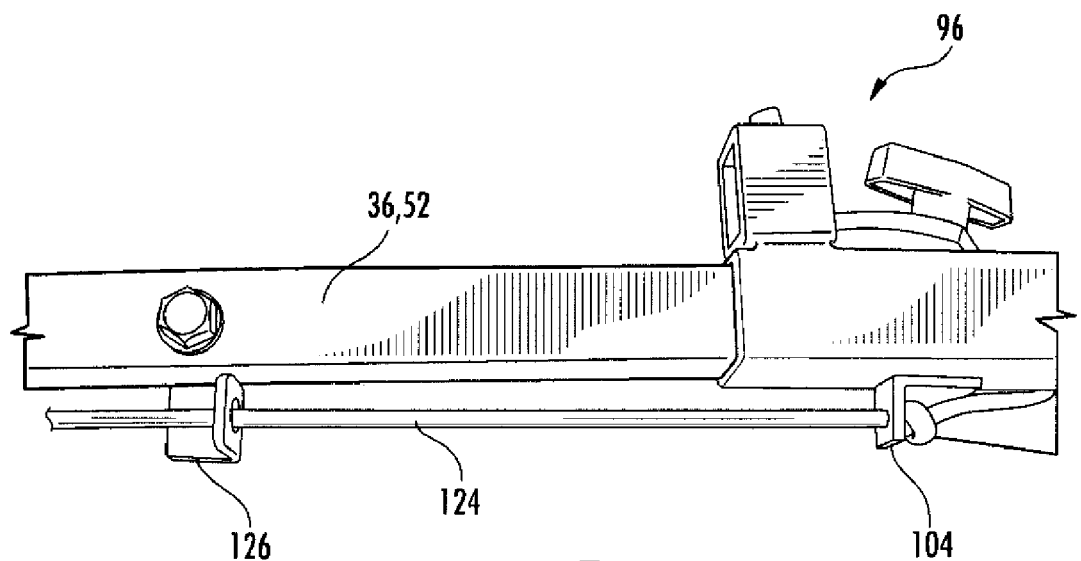
FIG. 7 illustrates a side view of the adjusting assembly and resilient biasing member mounted on an outer parallel arm.

As shown in FIG. 7, a resilient biasing member 124 extends from a first retaining member 104 on each adjusting assembly 96 to a second retaining member 126 proximal to the pivotal connection of outer parallel arm 36 to inner frame 18. In this embodiment retaining member 126 includes a slotted flange. Resilient biasing member 124 may be an elastic cord, or other resilient material.

Tubular axle sleeve 44 is affixed, for example, by welding to the bottom surface of the inner parallel arms 30 proximal to the pivotal connection of inner frame 18 and outer frame 20. A seat 46 is slidably mounted on inner frame 18, having a travel distance determined by cross member 32 and axle sleeve 44. In the embodiment shown in FIG. 5, the length of the first and second inner parallel arms 30 permit seat 46 to be positioned toward the pivotal connection of inner frame 18 and outer frame 20 to permit the user to sit inside the inner frame 18 and outer frame 20, facing the columnar member 16. The seat 46 can also be moved along inner frame 18 toward cross member 32 to permit the user to sit facing away from the columnar member 16.

Figure 8:
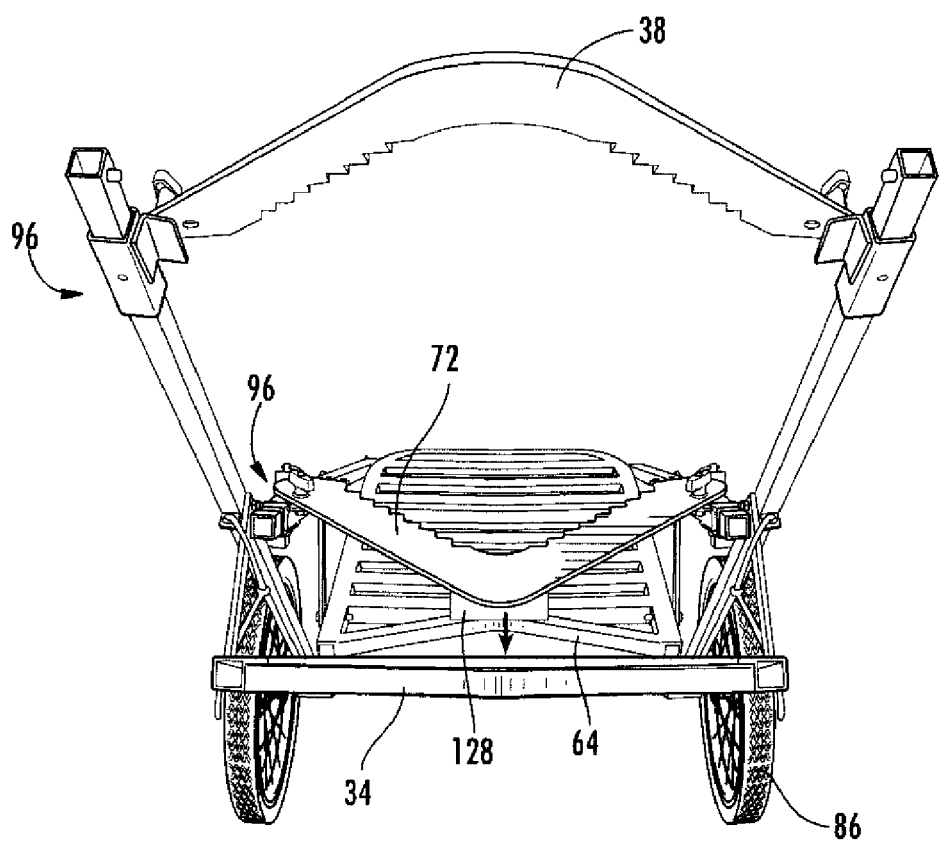
FIG. 8 illustrates a perspective view of the orientation of the interlocking means.
Figure 8A:
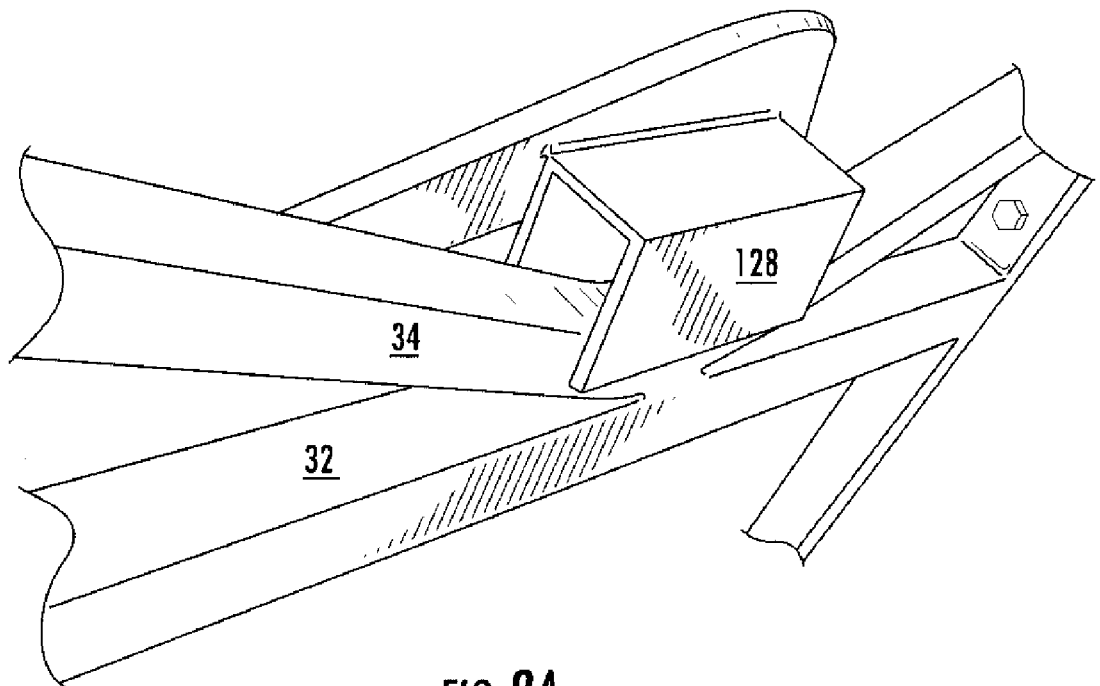

Lower climbing member 14 is essentially identical to upper climbing member 12 except that lower climbing member 14 is adapted to serve as standing platform and a footrest. Hence, no seat is provided. Lower climbing member 14 includes a tubular inner frame 50 and a tubular outer frame 52, which are pivotally connected by fasteners 22 through hole 48 in flange 106. A first and second connecting member 27 are disposed between inner frame 50 and outer frame 52. Each connecting member 27 is attached to inner frame 50 and to outer frame 52 by fasteners 22. Inner frame 50 includes a base end 54, a first and second inner parallel arm 56 projecting outward from base end 54, a first cross member 58 connecting and bracing the inner parallel arms 56, a plurality of lateral members 108 connecting the first and second inner parallel arms 56 to act as a platform floor and an inner jaw 64 at the distal ends of inner parallel arms 56. An adjustable foot strap 68 is affixed by a permanent fastener 70 to the first and second inner parallel arms 56. Outer frame 52 includes a first and second projecting outer parallel arm 74. Around the first and second outer parallel arms 74 is seated a first and second adjusting assembly 96. On the distal end of each outer parallel arm 74 is situated a detent button 98. Outer jaw 72 is attached at each end to adjusting assembly 96 by fastener 26 through hole 48 in flange 98. As shown in FIG. 8, a resilient biasing member 110 extends from a first retaining member 104 on adjusting assembly 96 to a second retaining member 104 mounted on the bottom side of outer parallel arm 74 proximal to the pivotal connection of outer parallel arms 74 to inner frame 50, which in this embodiment are comprised of slotted flanges. An interlocking member 128 comprised of a three-sided clasp is affixed to the bottom surface of outer jaw 72, in this case by welding.

Lower climbing member 14 may be tethered to upper climbing member 12 by adjusting lines 130 which are shown attached to ring 116 on the upper climbing member 12 to ring 116 on the corresponding side of the lower climbing member 14.

The climbing operation of the second embodiment of the invention is substantially the same as discussed in U.S. Pat. No. 5,379,861, which is incorporated herein by reference, but modified to provide for an improved automatic or self-adjustment feature. Both the upper and lower climbing members 12, 14 have fasteners 26 for loosening the outer jaw 38 for surrounding or for engaging the upright columnar member 16, and only one fastener 26 need be removed and the outer jaw 38 (or 72) wrapped around the upright columnar member 16 and reattached to the adjusting assembly 96 to engage the upright columnar member 16 and thereby mount the climbing member 12, 14 to the columnar member 16.

Once outer jaw 72 has been reattached to adjusting assembly 96, the initial position of climbing member 14 is set around upright columnar member 16 by bringing inner jaw 64 against the surface of upright columnar 16 while climbing member 14 is positioned flat on the ground or at a desired initial elevation above the ground. Pin 110 is then released from the stored position within pin housing 112 by turning pin 110 approximately 90 degrees using ring 116. Appropriate holes 118 and 48 along the outer parallel arm 74 are aligned by cocking the lower climbing member 14 upward slightly so that the adjusting member 96 slides under biasing force relative to the outer parallel arm 74 until outer jaw 72 comes in contact with the opposite side of upright columnar member 16 and pin 110 drops through aligned holes 118 and 48. The process is repeated for the adjusting assembly 96 on the opposing outer parallel arm 74 to bring both ends of outer jaw 72 into the desired position. This results in the lower climbing member 14 being placed in an initial position on upright columnar member 16 in either a substantially level orientation relative to the ground or with the base end 54 cocked slightly upward. Next, the upper climbing member 12 is mounted on the upright climbing member 16 in substantially the same fashion with the initial elevation of upper climbing member 12 being chosen to correspond to a desired sitting position on seat 46.

Once an initial position is established for both climbing members 12, 14, the user can sit in the seat 46 of upper climbing member 12, facing the upright columnar member 16. Using his or her feet, the user places his or her toes and insteps under foot strap 68. By pulling up on foot strap 68, the user cocks the lower climbing member 14 upward, increasing the horizontal spacing between inner jaw 64 and outer jaw 72. Lower climbing member 14 is thus free to slide along columnar member 16. By pulling up with his or her feet, the user can pull lower climbing member 14 up to a position just below upper climbing member 12. By pushing down on lateral members 108 and cocking the lower climbing member 14 in the opposite direction, the horizontal space between inner jaw 64 and outer jaw 72 is reduced, thus reengaging climbing element 14 with upright columnar member 16. The angle of base end 54 can then be adjusted by pulling on lines 138 attached to rings 116 of pin assemblies 102. This pulls pin 110 out of aligned holes 118 and 48, respectively. Resilient biasing members 124 keep outer jaw 72 biased against upright columnar member 16. The user, by slightly rocking the lower climbing member 14 with his or her feet can cause holes 118, 48 to align and can then release pin 110 to engage the holes and again adjusting assembly 96 in place. The horizontal distance between inner jaw 64 and outer jaw 72 will be changed to account for tapering (reduced for ascent, increased for descent) because resilient biasing member 124 (FIG. 7) pulls outer jaw 72 toward inner jaw 64.

Once the lower climbing member 14 is raised to the desired position and locked into place with a satisfactory angle automatically adjusted, the user stands on the lower climbing member 14 and releases the upper climbing member 12 by cocking the upper climbing member 12 outward and upward. As was the case for the lower climbing member 14, this increases the horizontal distance between the inner jaw 34 and outer jaw 38. The upper climbing member 12, which is gripped by the user's hands can then be slidably moved along the columnar member 16 to a new position corresponding to a desired seating position. At such location, the pins 110 of pin assemblies 102 are pulled, removing the pin 110 from aligned holes 118 and 48, respectively. As was the case for the lower climbing element 14, the resilient biasing member 124 pulls outer jaw 38 toward inner jaw 34. By rocking the upper climbing member 12, holes 118 and 48, respectively, can be aligned and pin 110 reinserted into position. The upper climbing member 12 is thus repositioned.

By alternately moving the upper and lower climbing members in step-wise tandem fashion as described above, and as is known in the art, a user of the climbing apparatus can advance up or down an upright columnar member. The angle of each of the upper and lower climbing elements can be adjusted at each new position using the invention, as described above. Thus, a stable, essentially level standing and sitting platform can be established at each new location along the upright columnar member. If desired, the angle can be chosen to tend to move the user toward the upright columnar member 16.

Figure 9:
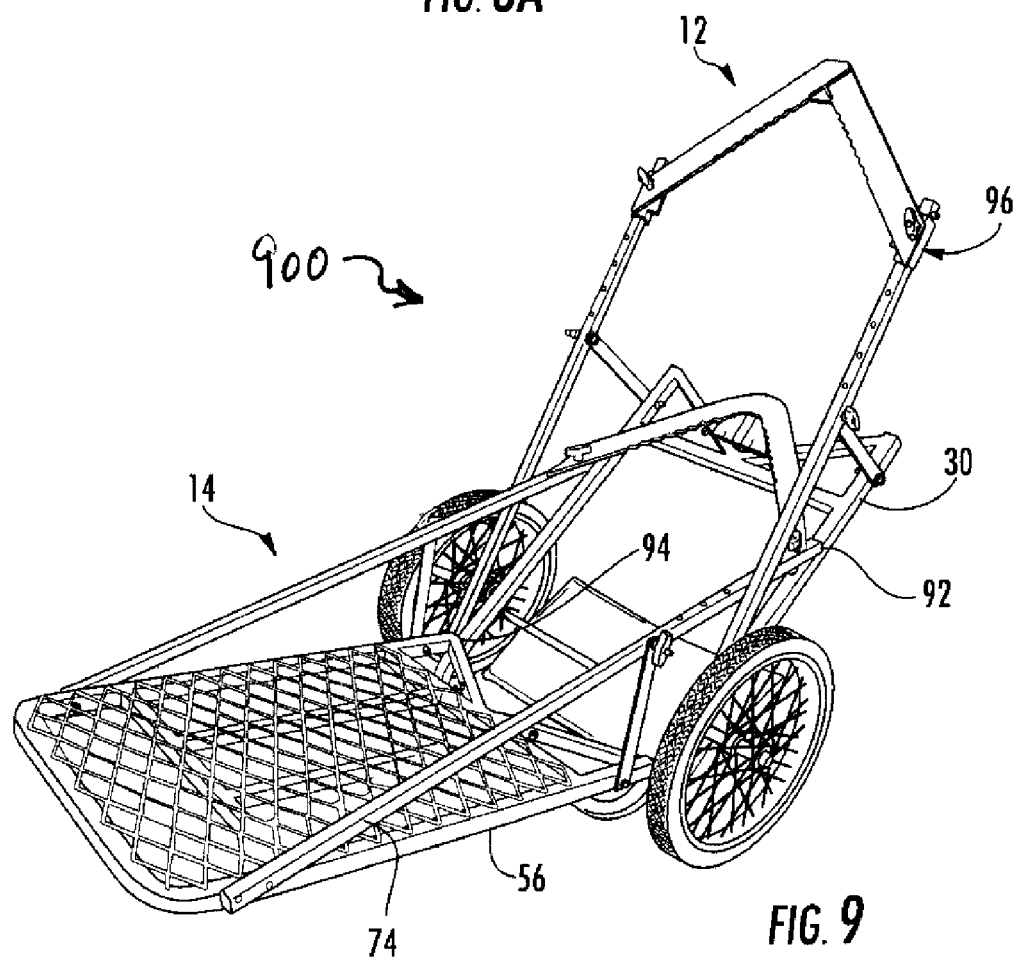
FIG. 9 illustrates a perspective view of the cart formed by interlocking the upper and lower climbing members.

As shown in FIG. 8, the interlocking member 128 of lower frame member 14 is formed to fit around inner jaw 34 of upper frame member 12 along its most concave point. When detached from upright columnar member 16, the cart is formed by moving the pin assemblies 100 to engage in holes 48 closest to the distal ends of the outer parallel arms 36 and outer parallel arms 74 respectively. As shown in FIG. 2, Axle 84 is inserted through axle sleeves 44 and a first and second wheel 86 are secured to axle 84 by suitable wheel fasteners known in the art. In this embodiment, the wheel fasteners are comprised of a cotterpin 88 inserted through axle hole 90. It is possible to leave the axles and wheels mounted to the upper frame member 12 while it is being used as a tree stand, however axle 84 would possibly constrain the movement of the user's legs while sitting on seat 46. The cart is then formed by taking the outer jaw 72 of lower frame member 14 and pulling it through the inner sides of the first and second inner parallel arms 30 of upper frame member 12 and over the top surface of inner jaw 34 and pushing interlocking member 128 down over the most concave portion of inner jaw 34. As shown in FIG. 9, in this position, the projecting ends of outer parallel arms 74 are resting on inner parallel arms 30 at a first pressure point 92 and the projecting ends of inner parallel arms 56 are resting on inner parallel arms 30 at a second pressure point 94. Thus, upper frame member 12 and lower frame member 14 are mechanically interlocked by operation of interlocking member 128 and the weight of lower frame member 14 resting on upper frame member 12.

The embodiments described herein can be made of any suitable material that is reasonably lightweight and durable and capable of supporting a user of typical weight and physical dimensions. The embodiments are preferably made of welded tubular steel or aluminum steel.

Figure 10:
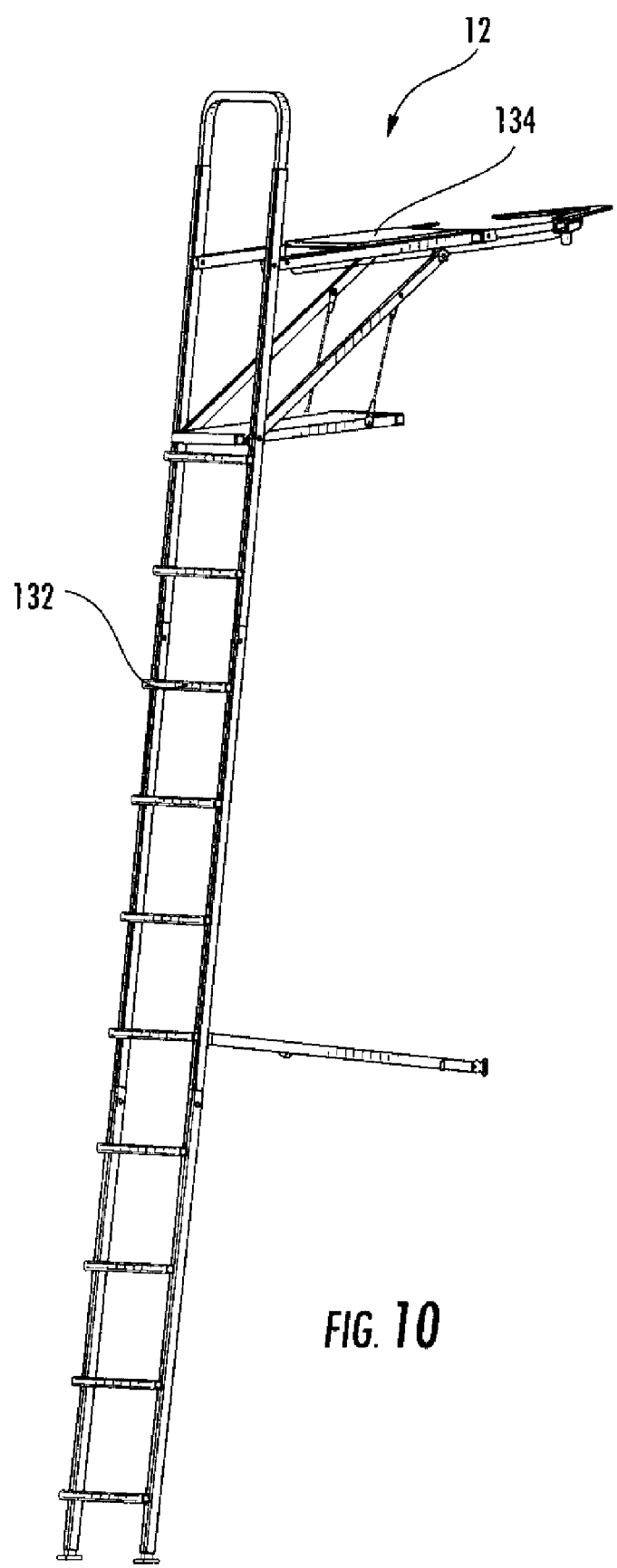
FIG. 10 illustrates another embodiment of a ladder-style tree stand.

Referring next to FIG. 10, the adjusting assembly 96 may be used in other applications where a portable platform or seating device, such as upper climbing member 12 or lower climbing members 14, is needed. An upper climbing member 12 may be attached to one end of a ladder 132, where the ladder includes a platform 134. The ladder 132 provides desired elevation for the platform 134, and the upper climbing member 12 provides a seat 46 or additional safety as the user is surrounded by arms 22, cross member 32 and base end 28. Similarly, a lower climbing member may be placed atop one end of a ladder 132 to provide an elevated platform only. In addition to a ladder, other climbing devices may include tripods, scaffolds, and the like. U.S. Pat. No. 5,332,063, discloses an exemplary ladder stand and the same is incorporated herein by reference.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for climbing an upright columnar member, comprising:

a first climbing member comprising:

a first inner frame comprising a first jaw configured to grip the columnar member and a first pair of inner arms connected to the first jaw, the first inner frame adapted to extend outwardly from the columnar member;

a first outer frame comprising a second jaw configured to grip the columnar member, the second jaw lying in a separate plane from the first jaw and capable of being disposed on a first side of the columnar member while the second jaw is capable of being disposed on a second side of the columnar member, the first side of the columnar member being opposite the second side, and a first pair of outer arms connected to the second jaw and each arm of the first pair of arms are respectively adapted to extend on opposing sides of the columnar member;

the first inner and first outer frames pivotally connected adjacent one end of the first pair of outer arms;

a first pair of connectors, each connector of the first pair of connectors is attached to a respective side of the first inner and first outer frame to maintain a relationship between the first inner frame and the first outer frame;

an adjustment arrangement configured to engage or disengage the second jaw from the first pair of outer arms to permit extension and retraction of the distance between the first jaw and the second jaw in order to be capable of accommodating a circumference of the columnar member;

a second climbing member comprising:

a second inner frame comprising a third jaw configured to grip the columnar member and a second pair of inner arms connected to the third jaw and respectively adapted to extend on opposing sides of the columnar member;

a second outer frame comprising a fourth jaw configured to grip the columnar member, the fourth jaw lying in a separate plane from the third jaw and capable of being disposed on a first side of the columnar member while the third jaw is capable of being disposed on a second side of the columnar member, the first side of the columnar member being opposite the second side, and a second pair of outer arms connected to the fourth jaw, the second outer frame adapted to extend on opposing sides of the columnar member;

the second inner frame is pivotally connected with the second outer frame adjacent one end of the pair of outer arms;

a second pair of connectors, each connector of the second pair of connectors is attached to a respective side of the second inner and second outer frame to maintain a relationship between the second inner frame and the second outer frame;

a second adjustment arrangement for engaging and disengaging the fourth jaw from the second pair of outer arms to permit extension and retraction of the distance between the fourth jaw and the third jaw in order to be capable of accommodating the upright columnar member;

a surface mounted on the second inner frame; and a strap attached to the second inner frame and extending across the surface;

the first and second climbing members adapted to ascend or descend the upright columnar member;

a wheel assembly removably attachable to the first inner frame of the first climbing member or the second inner frame of the second climbing member; and an interlock member affixed to the second climbing member, the interlock member configured to engage the first jaw of the first climbing member to form a cart;

wherein the first jaw and the third jaw respectively are formed with a concave shape and the second jaw and the fourth jaw respectively are formed with a convex shape; and the interlock member is capable of engaging the fourth jaw to the first jaw and the interlock member on the second climbing member is capable of interlocking with the first climbing member when the second climbing member is resting on the first climbing member; and wherein the interlock member is directly mounted on a top surface of the fourth jaw and comprises a catch, the catch contoured to fit against a top surface of the first jaw when the top surface of the fourth jaw is disposed beneath a bottom surface of the first jaw.

2. Apparatus as in claim 1, comprising:

the first adjustment arrangement comprising a first and a second adjustment assembly wherein each adjustment assembly is removably attached to the second jaw and is slidably mounted on each first outer arm respectively; each of the first and second adjustment assembly comprising a respective first locking member engageable with the first outer arms respectively for retaining the first adjustment arrangement in a selected position along a length of each respective first outer arm;

a first resilient biasing member is releasably attached to the first adjustment arrangement and is independent of the first jaw, for biasing the second jaw against the columnar member;

a first attachment device connected to the first resilient biasing member for externally securing the first resilient biasing member to the first pair of outer arms.

3. Apparatus as in claim 2, comprising:

the second adjustment arrangement being comprised of a third and fourth adjustment assembly wherein each of the third and fourth adjustment assembly is removably attached to the fourth jaw and is respectively slidably mounted on each of the second outer arms; each of the third and fourth adjustment assembly comprising a respective second locking member configured to maintain the second adjustment arrangement in a selected position along the length of the second pair of outer arms;

a second resilient biasing member is releasably attached to the second adjustment arrangement and is independent of the third jaw, for biasing the fourth jaw against the columnar member;

a second attachment device connected to the second resilient biasing member for externally securing the second resilient biasing member to the second pair of outer arms;

the first and second climbing members adapted to ascend or descend the columnar member.

4. Apparatus as in claim 3, wherein each of the resilient biasing members comprises of an elastic cord releasably attached between their respective adjustment arrangements and their respective outer arms, and each respective adjustment arrangement is further comprised of a first and second tubular carriage surrounding each of the respective outer arms of each adjustment arrangement, wherein the second jaw and the fourth jaw are removably fastened to a respective flange on each respective adjustment arrangement.

5. Apparatus as in claim 3, wherein each locking member is comprised of a respective spring actuated pin locking mechanism.

6. Apparatus as in claim 5, wherein each respective spring actuated pin locking mechanism comprises:

a housing mounted on each respective adjustment assembly, the housing comprising a shoulder formed therein;

a pin comprising a keeper formed near an end thereof;

a spring mounted along the pin and held between the keeper and the housing for biasing the pin against the housing and the shoulder;

each respective adjustment assembly comprising a mating hole aligned with said respective pin; the first and second pair of outer arms respectively comprising a respective plurality of holes along said first and second pair of outer arms respectively, each said hole of said plurality of holes are adapted to be aligned with the respective mating hole of the respective adjustment assembly;

wherein the respective pin can disengage from the respective adjustment assembly from a fixed position along the respective pair of outer arms when pulled outward and turned such that the respective keeper engages the respective shoulder, and wherein the respective pin engages the respective hole along the respective outer arms when turned and released, thus engaging one of the respective aligned plurality of holes in the respective adjustment arrangement and the respective outer arms.

7. Apparatus as in claim 1, wherein the first and second climbing members are tethered together by a pair of lines releasably connecting the first climbing member to the second adjustment arrangement.

8. Apparatus as in claim 1, further comprising the surface as configured to support game and other articles when the apparatus is used as a cart.

9. An apparatus for climbing an upright columnar member, comprising:

a first climbing member comprising:

a first inner frame comprising a first jaw configured to grip the columnar member and a first pair of inner arms connected to the first jaw, the first inner frame adapted to extend outwardly from the columnar member;

a first outer frame comprising a second jaw configured to grip the columnar member, the second jaw lying in a separate plane from the first jaw and capable of being disposed on a first side of the columnar member while the second jaw is capable of being disposed on a second side of the columnar member, the first side of the columnar member being opposite the second side, and a first pair of outer arms connected to the second jaw and each arm of the first pair of arms are respectively adapted to extend on opposing sides of the columnar member;

the first inner and first outer frames pivotally connected adjacent one end of the first pair of outer arms;

a first pair of connectors, each connector of the first pair of connectors is attached to a respective side of the first inner and first outer frame to maintain a relationship between the first inner frame and the first outer frame;

an adjustment arrangement configured to engage or disengage the second jaw from the first pair of outer arms to permit extension and retraction of the distance between the first jaw and the second jaw in order to be capable of accommodating a circumference of the columnar member;

a second climbing member comprising:

a second inner frame comprising a third jaw configured to grip the columnar member and a second pair of inner arms connected to the third jaw and respectively adapted to extend on opposing sides of the columnar member;

a second outer frame comprising a fourth jaw configured to grip the columnar member, the fourth jaw lying in a separate plane from the third jaw and capable of being disposed on a first side of the columnar member while the third jaw is capable of being disposed on a second side of the columnar member, the first side of the columnar member being opposite the second side, and a second pair of outer arms connected to the fourth jaw, the second outer frame adapted to extend on opposing sides of the columnar member;

the second inner frame is pivotally connected with the second outer frame adjacent one end of the pair of outer arms;

a second pair of connectors, each connector of the second pair of connectors is attached to a respective side of the second inner and second outer frame to maintain a relationship between the second inner frame and the second outer frame;

a second adjustment arrangement for engaging and disengaging the fourth jaw from the second pair of outer arms to permit extension and retraction of the distance between the fourth jaw and the third jaw in order to be capable of accommodating the upright columnar member;

a surface mounted on the second inner frame; and a strap attached to the second inner frame and extending across the surface;

the first and second climbing members adapted to ascend or descend the upright columnar member;

a wheel assembly removably attachable to the first inner frame of the first climbing member or the second inner frame of the second climbing member; and an interlock member affixed to the second climbing member, the interlock member configured to engage the first jaw of the first climbing member to form a cart;

wherein the first jaw and the third jaw respectively are formed with a concave shape and the second jaw and the fourth jaw respectively are formed with a convex shape; and the interlock member is capable of engaging the fourth jaw to the first jaw and the interlock member on the second climbing member is capable of interlocking with the first climbing member when the second climbing member is resting on the first climbing member; and wherein the interlock member is directly mounted on a bottom surface of the fourth jaw and comprises a clasp, the clasp conformable to connect with the first jaw when the bottom surface of the fourth jaw is above a top surface of the first jaw.

* * * * *